United States Patent
Kirby

[11] Patent Number: 6,067,918
[45] Date of Patent: May 30, 2000

[54] SOIL CONTACTING FINGER WHEEL

[76] Inventor: Donald Kirby, P.O. Box 126, Rouleau, Saskatchewan, Canada, S0G 4H0

[21] Appl. No.: 09/074,839

[22] Filed: May 8, 1998

[51] Int. Cl.$^7$ .................................................... A01C 23/02
[52] U.S. Cl. ............................................ 111/121; 111/118
[58] Field of Search .............................. 111/52, 186, 118, 111/120, 121, 130, 137, 924; 172/142, 146, 172, 177, 200, 558

[56]  References Cited

U.S. PATENT DOCUMENTS

| | | | |
|---|---|---|---|
| 3,504,646 | 4/1970 | Trahms | 111/121 |
| 5,303,663 | 4/1994 | Salestrom | 111/118 |
| 5,443,023 | 8/1995 | Carroll . | |
| 5,497,717 | 3/1996 | Martin . | |
| 5,622,124 | 4/1997 | Smith et al. | 111/121 |
| 5,682,829 | 11/1997 | Sukup | 111/121 |
| 5,752,453 | 5/1998 | Nikkel et al. | 111/121 |

*Primary Examiner*—Robert E. Pezzuto
*Attorney, Agent, or Firm*—Patterson & Keough, P.A.

[57] ABSTRACT

A finger wheel adapted to follow behind and/or beside a furrow opener at varying angles to the vertical and to the direction of travel. The finger wheel is useful for covering a furrow with loose soil to retain gaseous material such as anhydrous ammonia in the soil. The finger wheel is also useful for removing dry soil from the top of a seed furrow to reduce the effective depth of seeding and improve emergence. Also provided are a gaseous material injector and seeding apparatus using a known double inclined disc in combination with the finger wheel.

18 Claims, 8 Drawing Sheets

SOIL CONTACTING FINGER WHEEL

This invention deals with the field of agricultural seeding and fertilizing machines and in particular a finger wheel for use with such machines.

BACKGROUND

Furrows for seed and fertilizer placement may be made by pulling a knife through the soil, or by a disc running at an angle to the direction of travel.

Recently double inclined discs have become available for providing furrows for seed and fertilizer, these discs requiring considerably less power to operate than a knife and providing improved penetration over conventional discs. Such a disc is shown in U.S. Pat. No. 5,609,114 to Barton. The disc is inclined from the vertical and toed in from the line of travel with the result that the disc draws itself into the ground. Seed or fertilizer is then introduced into the furrow. The Barton device includes a rear wheel which regulates the depth that the disc goes into the ground and packs the furrow.

As well as particulate seed and fertilizer, gaseous fertilizer, notably anhydrous ammonia, is commonly injected into furrows in soil. It is generally desired to place the gas as deep as possible, in the range of four to five inches, so as to best located for plant use.

Gaseous fertilizers are economical and therefore desirable, however, often the gas escapes from the furrow and is lost to the atmosphere instead of being absorbed into the ground. To combat this escape, the furrow is often packed after injection by a packer wheel passing along the furrow. Such packing however can squeeze the gas out of the soil into the atmosphere where it is lost.

Preferably, the soil around the gas injection location should be fractured and loosened so that the gas is retained in the cavities in loose soil. The furrow should be covered to prevent escape of the gas, but should not be packed, since packing removes the cavities and the gas is forced out of the soil.

The double inclined disc opener is well suited to providing a loose soil as such a disc raises the soil on one side of the disc, fracturing it and thereby providing cavities within the soil. The present packer wheels on such double inclined discs however pack that loose soil, thereby removing the cavities. Such double inclined disc openers also require a means to prevent the soil raised by the inclined disc from being thrown away from the disc as speeds increase. This means usually is a wide rubber wheel running close to the disc.

The knife opener similarly fractures the soil, and present practise is often to leave the furrow open and trust that conditions are such that loosened soil falls back into the furrow to prevent gas escape, or alternatively to pack the furrow, with the result that cavities in the soil are removed. Disc or paddle furrow sealers are also used behind knife openers, as discussed in U.S. Pat. No. 4,596,199 to Dietrich et al.(pages 1 & 2). These have difficulties working in heavy trash conditions such as may be encountered in reduced tillage farming.

Another common problem in agriculture is that while it is necessary to deposit seed into moist soil in order that it germinate and grow, in dry conditions moisture is often several inches under the surface of the soil. Seeding to this depth may allow the seed to germinate, however the plant will have trouble emerging from the surface to gather energy from the sun for further growth. Such deep seeded plants often die before emerging or are excessively weakened by the time they emerge.

Finger wheels have been used in the past to clear residue from the path of a furrow opener to improve penetration and prevent plugging. U.S. Pat. No. 4,785,890 to Martin and U.S. Pat. No. 5,349,911 to Holst et al. show a finger wheel for such an application.

Finger wheels have also been used to close furrows for planters, as disclosed in U.S. Pat. No. 5,497,717 to Martin and in U.S. Pat. No. 5,443,023 to Carroll. These devices comprise at least two finger wheels working together, and are solely addressed to the problem of covering a seed furrow in such way as to improve germination of the seed. They do not address the above problems of (1) retention of gaseous material in the soil, (2) preventing soil from being thrown away from a double inclined disc, (3) removing dry soil from the top of a seed furrow to improve emergence of seed placed deep in the soil in order to be placed in moisture. A single finger wheel, oriented so that the action thereof addresses these problems, would be beneficial.

SUMMARY OF THE INVENTION

It is an object of the present invention to provide a finger wheel for use with various furrow openers to improve gaseous fertilizer retention in the soil.

It is a further object of the present invention to provide such a finger wheel for use with double inclined disc openers that will improve emergence of seeded crops in dry soil conditions.

It is a further object of the present invention to provide a device for applying gaseous fertilizer that utilizes a combination of a double inclined disc and a finger wheel which provides improved gaseous fertilizer retention in the soil.

It is a further object of the present invention to provide such a device that prevents the soil raised by a double inclined disc furrow opener from being thrown away from the disc.

The invention accomplishes these objects providing a device for closing the furrows made by an agricultural gaseous material applicator, said device comprising a wheel having a plurality of fingers radially extending from the axis of rotation of said wheel; said wheel mounted to said gaseous material applicator and adapted to roll along the ground adjacent to a furrow made by said gaseous material applicator; and wherein the axis of rotation of said wheel is inclined from a position perpendicular to the line of travel such that the rear edge of said wheel is closer to said furrow than the front edge of said wheel and whereby soil moved by said fingers on said wheel moves towards said furrow.

To improve the action of the finger wheel and allow for varying conditions, the axis of rotation of the wheel could also be inclined from the horizontal. To allow further adjustment for conditions, the embodiment could provide adjustment of the inclinations of the wheel, the distance of its path from the furrow, and its position along the line of travel relative to the furrow opener.

The furrow opener could be a knife opener or a disc opener.

A knife opener typically leaves a ridge of soil on each side of the furrow. A finger wheel could advantageously be used to close such a furrow by moving the soil ridge on one side back over the furrow. The action of the wheel would of course move some adjacent soil as well as the soil ridge, and the furrow could be closed without packing, leaving the soil loose with cavities to retain the gaseous material.

While vertical discs are not generally used for gaseous application, the ridge left by such discs could easily be moved back over the furrow in the same manner as described above.

In another embodiment the invention provides an apparatus for injecting gaseous material into soil, said apparatus adapted to be mounted on a frame adapted to travel along the ground, said apparatus comprising a rotating furrow opening disc having an axis of rotation firstly inclined from a position perpendicular to the line of travel, such that the leading side of said disc moves soil to the leading side as it travels, said axis of rotation secondly inclined from the horizontal such that said leading side is above the trailing side of said disc; means to introduce a gaseous material at a point adjacent to the bottom of the furrow formed by said disc; a wheel having a plurality of fingers radially extending from the axis of rotation of said wheel, said wheel adapted to roll along the ground adjacent to the leading edge of said furrow; wherein the axis of rotation of said wheel is firstly inclined from a position perpendicular to the line of travel opposite the first inclination of said disc, and secondly inclined from the horizontal.

The finger wheel moves soil the rear as it passes, and the inclination of the finger wheel causes this rear position to be on top of the furrow.

In order to allow for varying soil conditions, there are preferably provided means to adjust the path of travel of said wheel with respect to said furrow, means to adjust the position along the line of travel of said wheel with respect to the position along the line of travel of said disc and means for varying the first and second inclinations of said wheel. The means to adjust the path of travel of said wheel could provide adjustment from a line of travel along said furrow to a line of travel removed from said furrow in the direction of the leading edge of said furrow.

The wheel could be adjusted so that it runs close behind a double inclined disc over the soil raised by the disc, preventing this soil from being thrown away from the disc. The inclination of the wheel to the direction of travel is opposite to the inclination of the disc, causing the soil caught by the fingers to be moved back over the furrow. The vertical inclination of the wheel and disc may be in the same or opposite directions.

The ends of the fingers on the wheel could preferably be sloped such that the trailing side of the fingers extends beyond the leading side of the fingers. In this way, as the wheel rotates, there is an enlarged surface on the ends of the fingers that first contacts the soil that is raised by the inclined disc, which enlarged surface better prevents this soil from being thrown away from the disc.

The mounting of the apparatus to the frame is preferably such that the wheel may move up and down independently of said disc, allowing it to pass over obstructions easily. The weight of the wheel forces it downwards and the action of the wheel will be dictated by its inclination with respect to the line of travel and its vertical inclination. Mounting the wheel in a fixed location relative to the disc would be possible in certain conditions, however the floating wheel would provide a much wider range of application.

The mounting of the disc to the frame could comprise an axle extending from the disc on its trailing side, the axle fixed to a disc bracket, the disc bracket attached to the frame in front of the disc. The first end of the disc bracket could be attached to the frame in front of the disc and the second end of the disc bracket could extend behind and below the disc axle. The means to introduce a gaseous material could comprise a boot pivotally mounted to the disc bracket at a point behind and below said disc axle, with the boot biassed downwards and adapted to ride along the bottom of the furrow. The boot could comprise a gaseous material conveying conduit ending in a discharge orifice at the bottom of said boot.

The discharge orifice could preferably direct the discharged gaseous material towards the leading side of the furrow at a point behind said disc. In this manner the gaseous material will not directly contact the disc, avoiding problems of freezing, since the discharged gaseous material is generally very cold. As is preferred as well, the gas is then directed towards the fractured soil on the leading side of the furrow, which soil contains cavities where the gas may be retained.

There is preferably provided means to adjust the depth the furrow cut by the disc. The disc bracket could be pivotally mounted to the frame such that the disc bracket may move from a lowest position to a highest position relative to the frame, and the disc bracket could be biassed downwards to said lowest position. The means to adjust the depth could then be by means raising and lowering the frame relative to the ground, whereby the disc cuts a furrow at the lowest position and may rise against the force of the biassing to the highest position in order to clear obstructions.

There could be provided means to clear material from the fingers of the wheel, to prevent such material from lodging in and plugging the fingers.

The finger wheel may also be utilized to remove soil from the top of a furrow in order to provide a reduced effective depth of seeding. The wheel will move soil, the amount varying with the type of finger and the amount of inclination from the direction of travel and the vertical. In the above embodiments this characteristic is used to cover a furrow. In a situation where the soil is dry and it is necessary to seed deeper than is desirable in order to seed into moist soil, the same characteristic may be used to remove dry soil from the top of the furrow in order to reduce the depth of soil a growing plant must grow through in order to emerge from the soil.

In another embodiment the invention provides a device attached to the frame of a furrow opening implement for removing dry soil from the top of a furrow comprising a wheel having a plurality of fingers radially extending from the axis of rotation of said wheel, said wheel adapted to roll along the top of said furrow, wherein said axis is inclined from a line perpendicular to the direction of travel.

In such a situation where a double inclined disc is the furrow opener, the wheel could be inclined in the same direction as the disc, and could be substantially parallel to the disc. In such an orientation an advantage would be had by the fingers acting to clean the leading side of the disc.

In another embodiment the invention provides a seeding apparatus for mounting on a frame adapted to travel along the ground, said apparatus comprising a rotating furrow opening disc having an axis of rotation firstly inclined from a position perpendicular to the line of travel, such that the leading side of said disc moves soil to the leading side as it travels, said axis of rotation secondly inclined from the horizontal such that said leading side is above the trailing side of said disc; means to introduce seeds into the furrow formed by said disc; a wheel having a plurality of fingers radially extending from the axis of rotation of said wheel, said wheel adapted to roll along the ground adjacent to said furrow; said wheel attached to said apparatus such that said axis of said wheel is firstly inclined from a position perpendicular to the line of travel in the same direction as said disc axis and said axis of said wheel is secondly inclined from the horizontal in the same direction as said disc axis and such that said fingers extend within the radius of said disc adjacent to the leading side of said disc; wherein said fingers act to clean the leading side of said disc and said fingers further act to remove soil from the top of said furrow.

When used as soil removal tool, provision of the same adjustments as provided above would be desirable.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE EMBODIMENT

Figure 1:
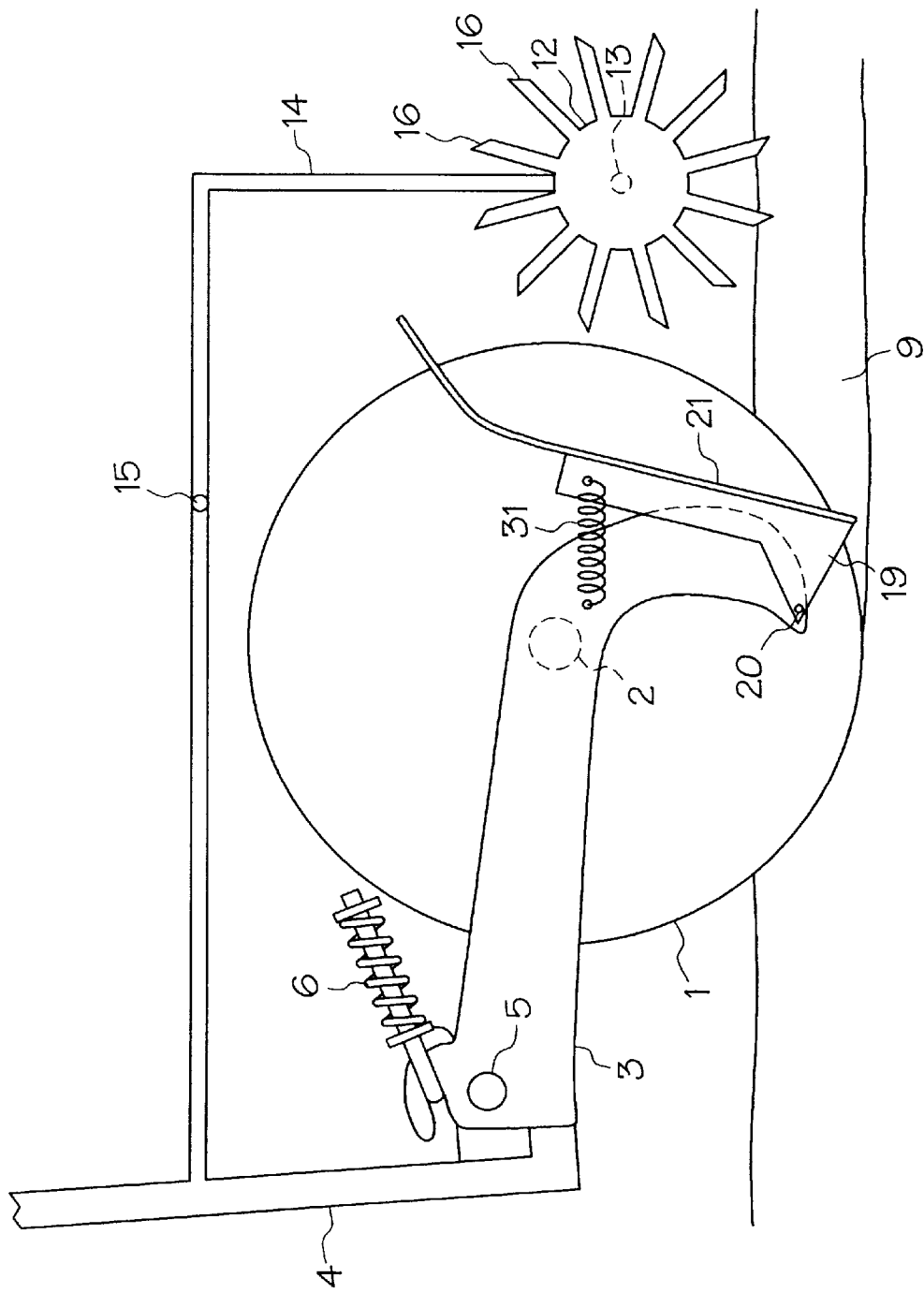
FIG. 1 is a side view of an embodiment of the invention which provides an apparatus for gaseous material application.

FIG. 1 shows one preferred embodiment of the invention for injecting gaseous material into soil. Disc 1 is rotatably mounted on disc axle 2 which is fixed to disc bracket 3. Disc bracket 3 is pivotally attached to an implement frame 4 at frame pivot point 5. Conventional disc spring 6 forces the disc 1 in a downwards direction. The lowest position of the disc 1 is shown. Under normal operating conditions, the disc 1 will operate at this lowest position. If upward force on the disc 1 exceeds the downward force of the disc spring 6 the disc 1 will pivot upwards about the frame pivot point 5 to a highest position. This allows the disc 1 to rise and roll over obstacles in the field.

Figure 2:
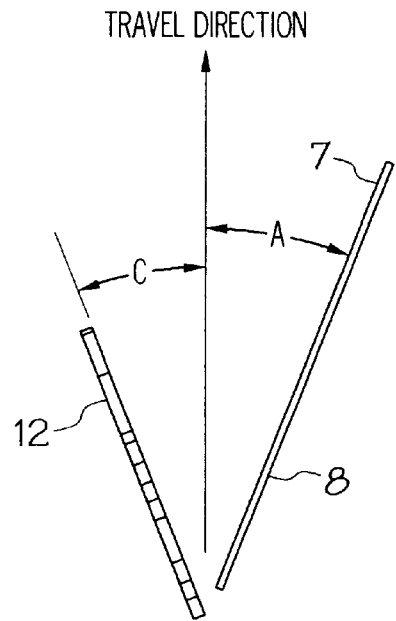
FIG. 2 is a schematic top view showing angles of inclination from the direction of travel of the disc and wheel.
Figure 3:
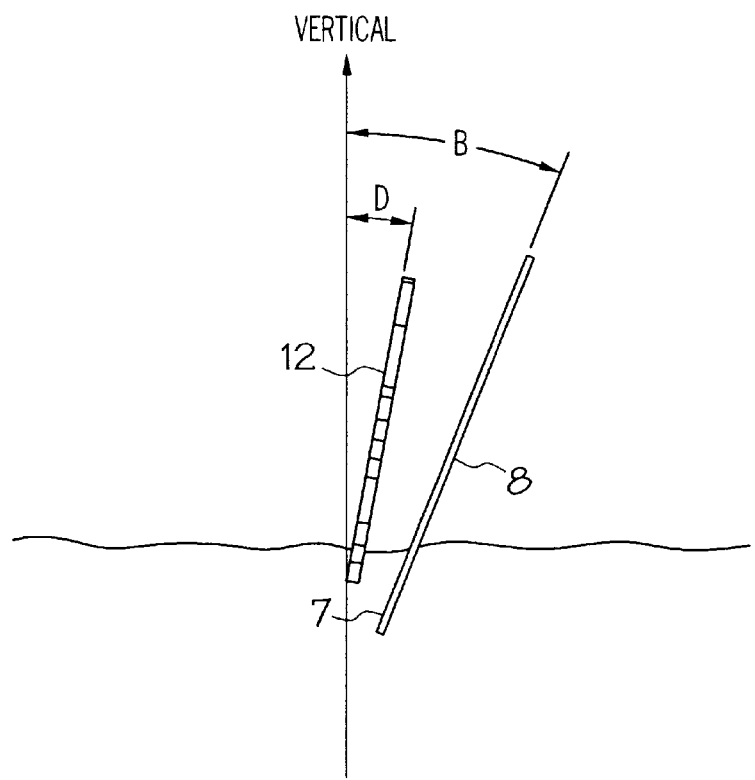
FIG. 3 is a schematic rear view showing angles of inclination from the vertical of the disc and wheel.
Figure 6:
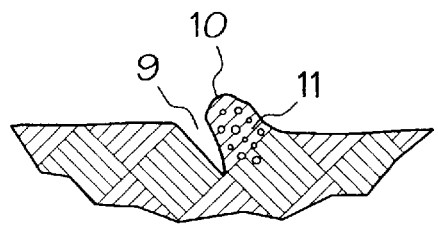
FIG. 6 is a cross-section view of the furrow made by double inclined disc opener.

The disc 1 is a double inclined disc furrow opener as is known in the art. The disc axle 2 is mounted to the disc bracket 3 so as to achieve the inclinations herein described. Referring to FIGS. 2 and 3, it is shown that the disc axle 2 is mounted on a first angle A from the direction of travel so that the leading side 7 of the disc 1 moves soil to the leading side 10 of a furrow 9. The disc axle 2 is also mounted on a second angle B from the vertical such that the leading side 7 is above the trailing side 8 of the disc 1. The disc 1 thereby pulls itself into the ground and cuts a furrow 9, as shown in FIG. 6. The soil 11 on the leading side 10 of the furrow 9 is fractured and loosened as it is lifted by the disc 1. In prior art devices, a wide wheel is generally mounted adjacent to the leading side 7 of the disc 1 to prevent this soil 11 from being thrown away from the disc 1 as the speed of the implement is increased.

The present invention utilizes a finger wheel 12 to retain this soil 11 adjacent to the furrow 9 and to move portions of it back over the furrow 9. Referring to FIGS. 2 and 3, it is shown that the finger wheel 12 is mounted on a first angle C to the direction of travel that is in the opposite direction to first angle B of the disc. The finger wheel 12 is also mounted at a second angle D to the vertical. In the preferred embodiment this angle D is in the same direction from vertical as the second angle B of the disc 1. It is contemplated that the finger wheel 12 would also function satisfactorily if the angle D was in the opposite direction from the vertical as the disc angle B.

The finger wheel 12 is rotatably attached to the wheel axle 13. The wheel axle 13 is attached to wheel bracket 14 which is pivotally attached to the frame 4 at wheel pivot point 15. Thus the wheel 12 is free to move up and down as it rides on the ground.

Conventional adjustments such as are known in the art and not further detailed are provided to vary the inclination and position of the wheel. Inclination angles have been determined by trial and error, and should be adjusted for different conditions of soil, trash, implement speed and so forth.

The inclination of the wheel to the direction of travel D is adjustable from approximately 3 degrees to 25 degrees. Adjustment of this inclination will vary the amount of soil over the furrow. The vertical inclination D of the wheel is adjustable from approximately 3 degrees to 25 degrees. Adjustment of inclination D will vary how deep the fingers go into the soil. The line of travel of the wheel 12 is adjustable from approximately on the furrow 9 to 5 inches away from the furrow 9 on the leading side 10 thereof. The position of the wheel 12 along the line of travel with respect to the disc 1 may be adjusted from a position where the wheel fingers 16 approach the centre of the disc 1 of the disc 1 to a position where the wheel fingers 16 are behind the rear edge of the disc 1.

Figure 4:
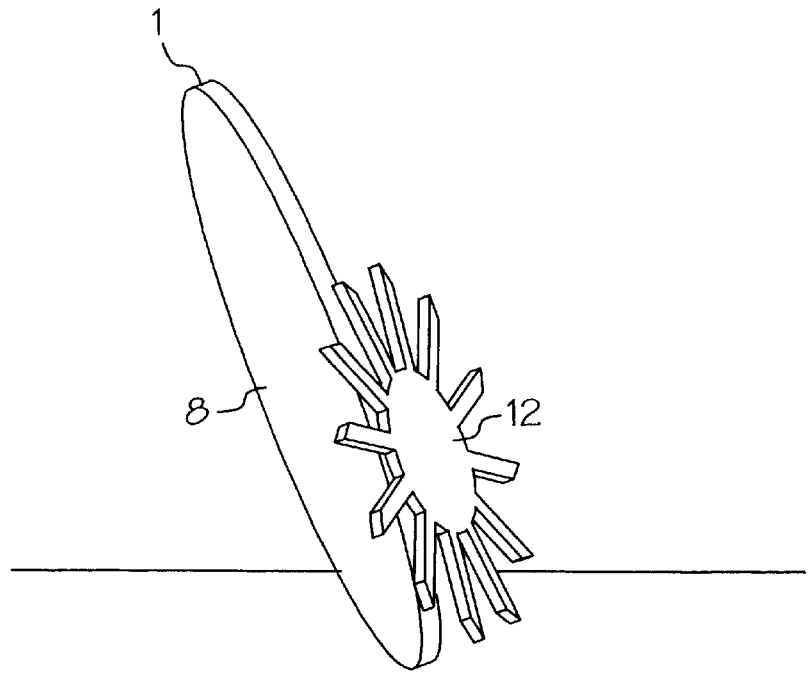
FIGS. 4 and 5 are rear views of the disc and finger wheel at different adjustment positions.
Figure 5:
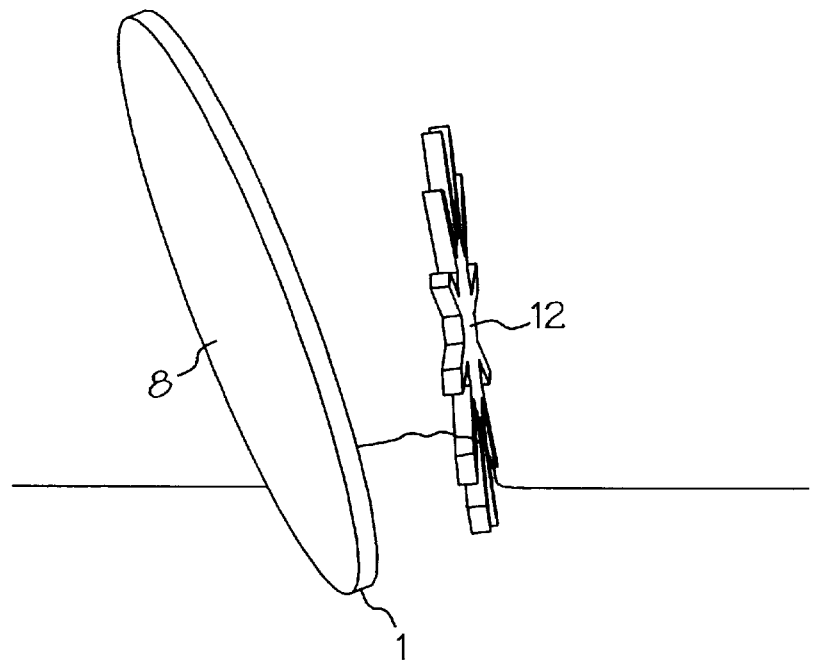

Referring to FIGS. 4 and 5, the resulting inclinations of the wheel 12 and disc 1 can be seen and the relative positions of the same. FIG. 4 shows the wheel 12 and disc 1 adjusted close together with angles from the vertical D and B very nearly the same. FIG. 5 shows the wheel 12 set farther away from the disc 1 and the angle D from the vertical of the wheel 12 substantially less than the angle B from the vertical of the disc 1.

The wheel should be adjusted so that the fingers 16 contact the loosened soil 11 at the leading edge 10 of the furrow 9 and move sufficient soil over the furrow 9 to cover it and prevent escape of the gaseous material. Adjustments along the line of travel and nearer or farther from the furrow 9 will facilitate prevention of the soil 11 being thrown away from the furrow 9.

Figure 8:
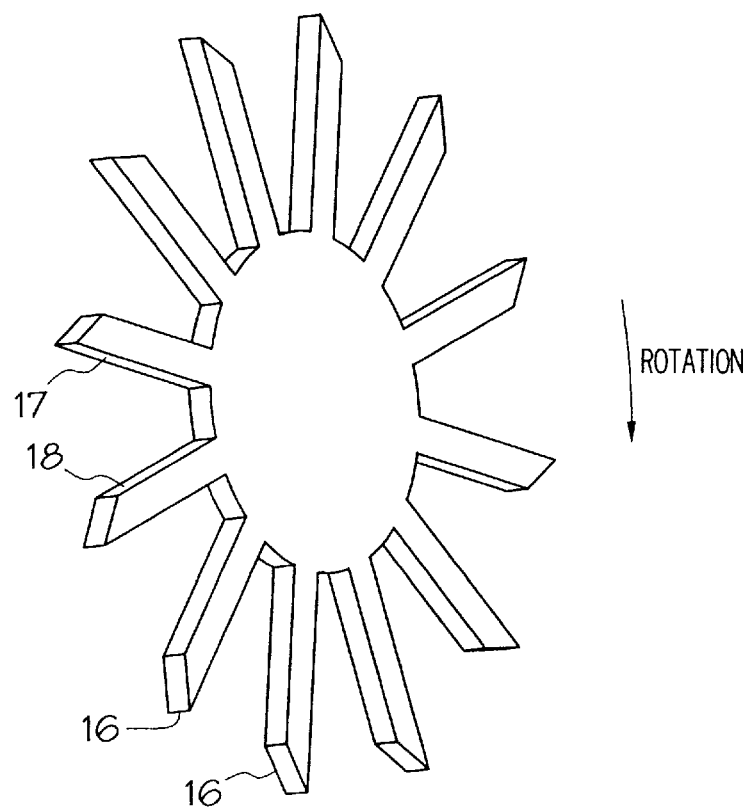
FIG. 8 is a perspective view of the finger wheel.

Referring to FIG. 8 it can be seen that wheel fingers 16 are square bars with ends sloped such that the trailing edge 17 of the fingers extend beyond the leading edge 18. As can be seen in FIG. 1, with this aspect, there is an enlarged surface area meeting the soil 11 and preventing same from being thrown. This aspect as well reduces the amount of soil kicked up as the fingers 16 rotate out of the ground. The aspect could be altered if it was desired to move more soil.

Disc bracket 3 extends below and behind the disc axle 2 so as to provide a pivot point 20 for pivotal attachment of the boot 19 at boot pivot point 29. Boot spring 31 pushes against the disc bracket 3 and boot 19 to provide downward biassing on the boot 19 to maintain its position at the bottom of the furrow 9. The boot 19 thus rides along the bottom of the furrow 9 cut by the disc 1.

Figure 9:
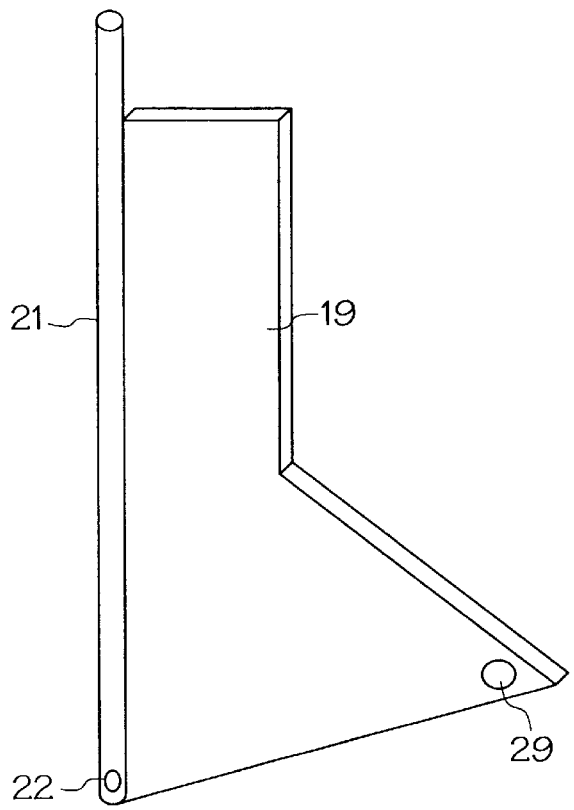
FIG. 9 is perspective view of the boot for injecting gaseous material.
Figure 10:
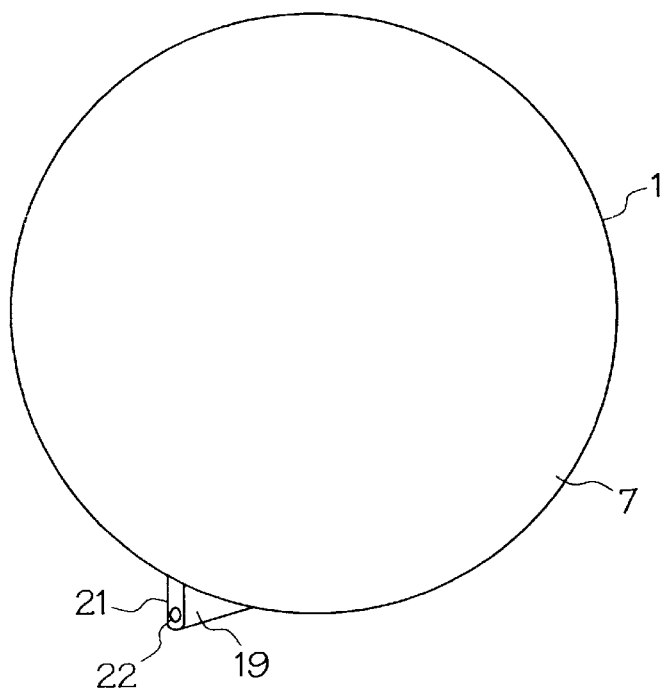
FIG. 10 is a side view showing the relative orientation of the boot and disc.
Figure 11:
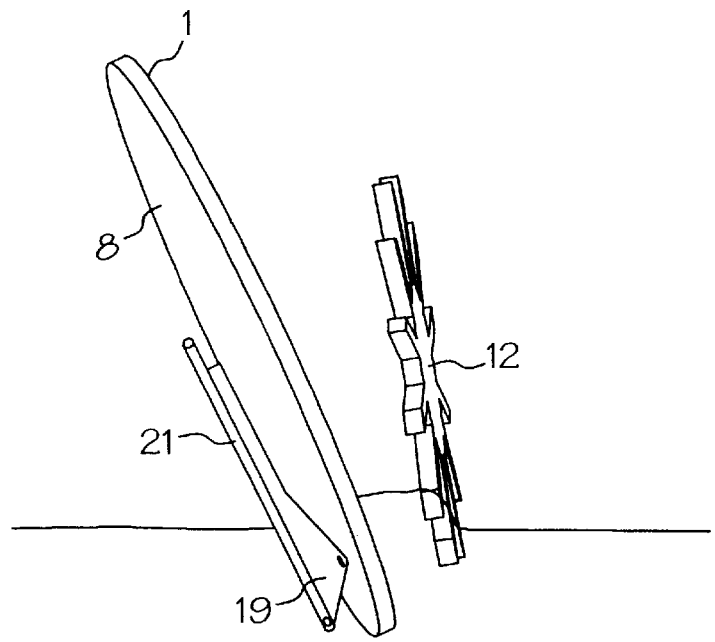
FIG. 11 is a rear view as in FIG. 5 with the addition of the boot.

Referring to FIG. 9, conventional means, not shown, supply gaseous material to a conduit 21 attached to the rear edge of the boot 19, terminating at discharge orifice 22 in the side of the conduit 21 directed toward the leading side 10 of the furrow 9. FIG. 10 shows the location of the orifice 22 relative to the disc 1. Directing the very cold gaseous material behind the disc 1 avoids the freezing problems which can cause soil build-up on frozen metal parts in contact with moist soil. Gaseous material is directed towards the loosened soil 11 that has been raised and fractured by the disc 1. FIG. 11 shows the wheel 12 and disc 1 positions of FIG. 5 with the addition of the boot 19 shown in its operating position. It is contemplated that many shapes and orientations of boots or other apparatus will serve the objective of introducing gaseous material into the bottom of the furrow, and as such are within the scope of the present invention.

Figure 7:
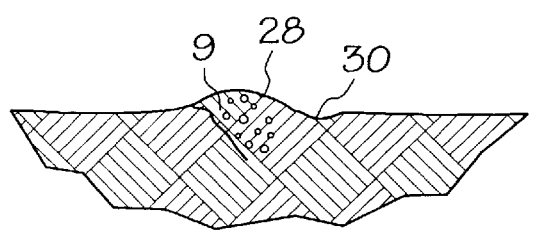
FIG. 7 is a cross-section view of the furrow of FIG. 6 after closing with the finger wheel.

Covering the furrow 9 with soil moved by the finger wheel 12 does not pack the furrow 9 and so the loosened soil 11 has cavities where the gaseous material may be retained, as shown in FIG. 7. The action of the wheel 12 will generally leave a slightly raised ridge of soil 28 and a slightly recessed trench 30. If this is seen to be a problem, a second finger wheel could be provided to spread this ridge, however such a ridge 28 will not generally be significant given the usual contours of a field.

The implement frame 4 is vertically adjustable so that the depth of the furrow may be adjusted.

Figure 12:
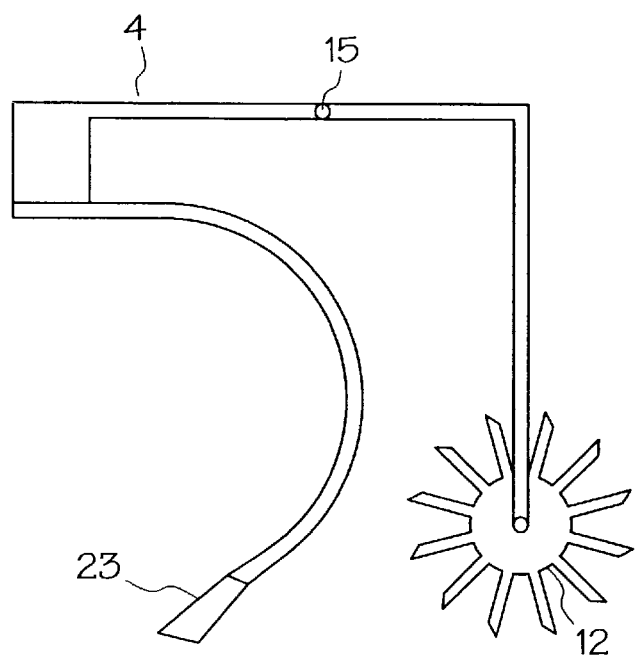
FIG. 12 is a side view of an embodiment for use with a knife furrow opener.
Figure 13:
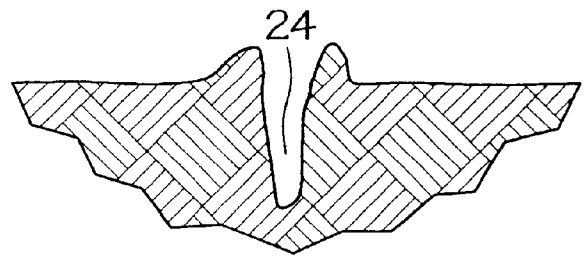
FIG. 13 is a cross-section view of the furrow made by a knife opener.
Figure 14:
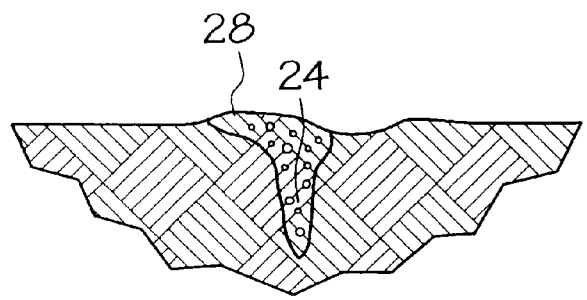
FIG. 14 is a cross-section view of the furrow of FIG. 13 after closing with the finger wheel.

FIG. 12 shows an embodiment for use with a knife opener. Wheel 12 is pivotally attached to the implement frame 4 at pivot point 15. Knife opener 23 is a known opener conventionally mounted to the implement frame 4, and makes the furrow 24 as shown in FIG. 13. FIG. 14 shows the furrow 24 after the finger wheel 12 passes over it. The furrow 24 is covered with loose soil 11, similar to the description above for a double inclined disc opener. Raised soil ridge 28 and trench 30 are evident again as well, and will be generally located on one side of the furrow 24, as the soil from only one side of the furrow 24 is moved over the furrow 24.

Figure 15:
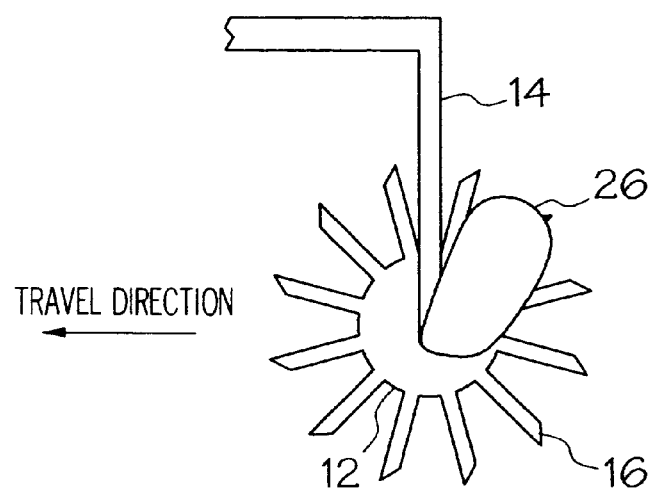
FIG. 15 shows a plate for removing material from the fingers of the wheel.

Turning to FIG. 15, a device is disclosed for removing material from the fingers 16. Debris plate 26 is attached to the wheel bracket 14 and is mounted close to the finger wheel 12. Debris plate 26 is shaped such that as the wheel 12 rotates in the direction of travel indicated, material between the fingers 16 contacts the debris plate and is forced off the end of the fingers 16.

Figure 17:
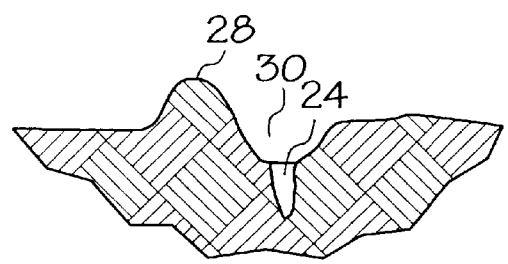
FIG. 17 is a cross-section view of the furrow made by a knife opener after the finger wheel has been used to remove dry soil from the top of the furrow.

For use to remove dry soil from the top of a seed furrow, the path of the wheel is adjusted so that the trench 30, as shown in FIG. 17, is over the seed, and the ridge 28 is beside the seed furrow 40. The angle D from the vertical is generally greater than for the previous embodiments, as is the angle C from the direction of travel. These increased angles provide a more aggressive finger wheel action, and move larger amounts of soil, providing a deeper trench 30. The mounting of the wheel can be similar to the illustrated embodiments. For example on a conventional air drill with hoe-openers, the wheel can be mounted the hoe-opener to remove soil as shown in FIG. 17, with the conventional packer wheels at the rear of the drill then packing the furrow.

Figure 16:
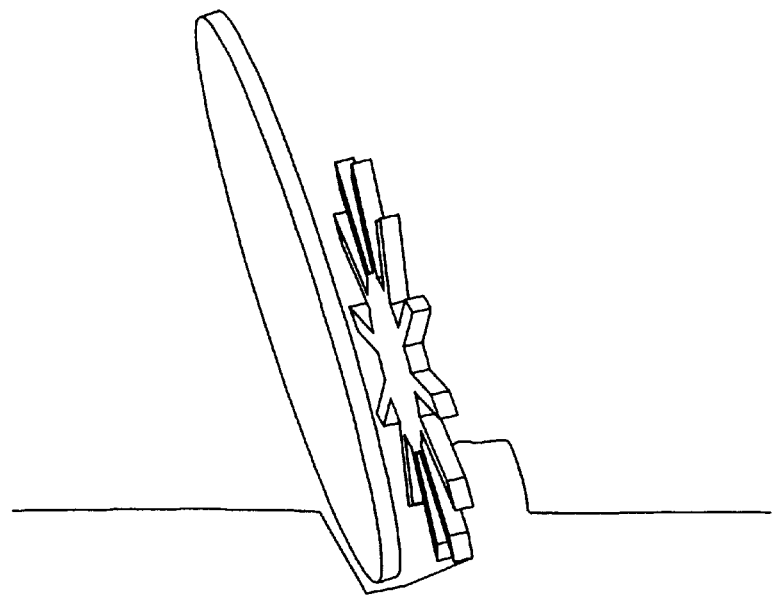
FIG. 16 is a rear view of the disc and finger wheel where the axis of the disc and wheel are inclined from the vertical and the direction of travel in the same direction.
Figure 18:
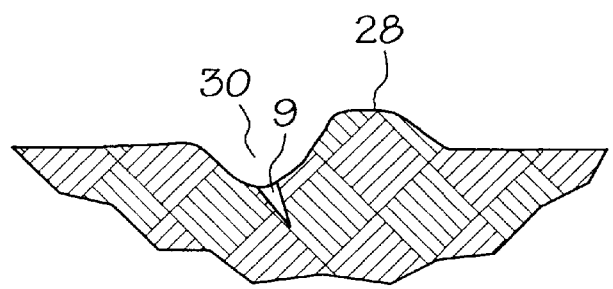
FIG. 18 is a cross-section view of the furrow made by a double inclined disc opener after the finger wheel has been used to remove dry soil from the top of the furrow.

Similarly, when used in conjunction with a double inclined disc, the wheel axis is at generally the same inclinations as the disc such that the wheel 12 may be substantially parallel with the disc 1, as shown in FIG. 16. In this orientation the furrow 9, ridge 28 and trench 30 of FIG. 18 may be achieved. It will be noted that with the finger wheel 12 at the same angle relative the direction of travel as the disc 1, the ridge 28 is on the opposite side of the trench 30 from the configuration of FIG. 7. The trench 30 is located over the furrow 9 so that the plant need grow only to the bottom of the trench 30 in order to emerge.

The furrow may then be packed conventionally. With these angles the fingers 16 of the wheel 12 will clean the leading side of the disc 1 provided the fingers 16 extend within the radius of the disc 1.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. An apparatus for injecting gaseous material into soil, said apparatus adapted to be mounted on a frame adapted to travel along the ground, said apparatus comprising:

a rotating furrow opening disc having an axis of rotation firstly inclined from a position perpendicular to the line of travel, such that a leading side of said disc moves soil to the leading side as it travels through the soil making a furrow, said axis of rotation secondly inclined from the horizontal such that said leading side is above a trailing side of said disc;

means to introduce a gaseous material at a point adjacent to the bottom of the furrow formed by said disc;

a wheel having a plurality of fingers radially extending from the axis of rotation of said wheel, said wheel adapted to roll along the ground on a path adjacent to the leading edge of said furrow;

wherein the axis of rotation of said wheel is firstly inclined from a position perpendicular to the line of travel opposite the first inclination of said disc, and secondly inclined from the horizontal.

2. The invention of claim 1 further comprising means to adjust the path of travel of said wheel with respect to said furrow.

3. The invention of claim 2 further comprising means to adjust the path of travel of said wheel from a line of travel along said furrow to a line of travel removed from said furrow in the direction of the leading edge of said furrow.

4. The invention of claim 1 further comprising means to adjust the position along the line of travel of said wheel with respect to the position along the line of travel of said disc.

5. The invention of claim 1 further comprising means for varying the first and second inclinations of said wheel.

6. The invention of claim 1 wherein the ends of said fingers are sloped such that the trailing side of the fingers extends beyond the leading side of the fingers.

7. The invention of claim 1 further comprising means to clear material from the fingers of the wheel.

8. The invention of claim 1 wherein said wheel may move up and down independently of said disc.

9. The invention of claim 8 wherein the mounting of said disc to said frame comprises an axle extending from said disc on the trailing side of said disc, said axle fixed to a disc bracket, said disc bracket attached to said frame in front of said disc.

10. The invention of claim 9 wherein a first end of said disc bracket is attached to said frame in front of said disc and a second end of said disc bracket extends behind and below said disc axle and wherein said means to introduce a gaseous material comprises a boot pivotally mounted to said disc bracket at a point behind and below said disc axle, said boot biased downwards and adapted to ride along the bottom of said furrow and wherein said boot comprises a gaseous material conveying conduit ending in a discharge orifice at the bottom of said boot.

11. The invention of claim 10 wherein said discharge orifice directs the discharged gaseous material towards the leading side of said furrow at a point behind said disc.

12. The invention of claim 11 further comprising means to adjust the depth of the furrow cut by said disc.

13. The invention of claim 12 wherein said disc bracket is pivotally mounted to said frame such that said disc bracket may move from a lowest position to a highest position relative to said frame, and said disc bracket is biased downwards to said lowest position, and wherein said means to adjust said depth is by means raising and lowering said frame relative to the ground, whereby said disc cuts a furrow at said lowest position and may rise against the force of said biasing to said highest position in order to clear obstructions.

14. The invention of claim 13 wherein the ends of said fingers are sloped such that the trailing side of the fingers extends beyond the leading side of the fingers.

15. The invention of claim 14 further comprising means to adjust the path of travel of said wheel with respect to said furrow.

16. The invention of claim 15 further comprising means to adjust the position along the line of travel of said wheel with respect to the position along the line of travel of said disc.

17. The invention of claim 16 further comprising means for varying the first and second inclinations of said wheel.

18. The invention of claim 17 further comprising means to clear material from the fingers of the wheel.

* * * * *